United States Patent Office 3,274,170
Patented Sept. 20, 1966

3,274,170
CARBOXYLIC ACID AMIDES
Ivar Ugi, Leverkusen, Klaus Offermann, Munich, and Friedrich-Karl Rosendahl, Leverkusen, Germany, assignors to Farbenfabriken Bayer Aktiengesellschaft, Leverkusen, Germany, a corporation of Germany
No Drawing. Filed Feb. 27, 1963, Ser. No. 261,518
Claims priority, application Germany, Mar. 9, 1962, F 36,223
3 Claims. (Cl. 260—112.5)

The present invention relates to carboxylic acid amides and to a novel process for the manufacture of carboxylic acid amides and in particular deals with its preparation by splitting N-alkenyl carboxylic acid amides.

The carboxylic acid amides have the general formula

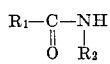

wherein $R_1$ represents hydrogen or an alkyl, aryl, aralkyl, heterocylic or carbonaminoalkyl radical and $R_2$ stands for hydrogen or an alkyl, aryl or aralkyl radical.

It has now been found, that a compound having the above general formula can be prepared by treating a N-alkenyl carboxylic acid amide of the formula

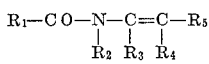

in which $R_1$ represents a hydrogen atom or an alkyl, aryl, aralkyl or heterocyclic radical, in particular a carbonamino-alkyl radical, $R_2$ represents a hydrogen atom or an alkyl, aryl, or aralkyl radical, $R_3$ and $R_4$ each represents a hydrogen atom or an alkyl radical and $R_5$ represents a hydrogen atom or an alkyl, acyl, carboxylic acid ester, carbonamide or cyanogen radical, in which $R_3$ and $R_4$, $R_4$ and $R_5$ and $R_3$ and $R_5$ together represent an alkylene, aza-alkylene or oxa-alkylene bridge, with water.

It is to be considered as extremely surprising that the N-alkenyl carboxylic acid amides to be used according to the invention can be split under such gentle conditions into carboxylic acid amides and carbonyl compounds. It is particularly surprising that optically active centres and also reactive groups are maintained when the N-alkenyl carboxylic acid amides are split.

The reaction according to the invention can be reproduced by the following equation:

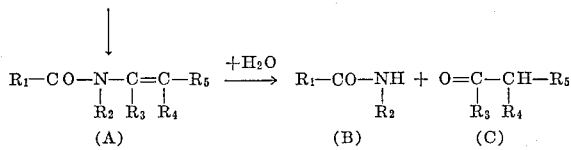

in which $R_1$ to $R_5$ have the meanings given above. The arrow over the N-alkenyl carboxylic acid amides (A) indicates the position of the molecule at which the splitting occurs. In the splitting process carboxylic acid amides corresponding to (B) are obtained as the main product and carbonyl compounds according to (C) as the secondary product.

The starting materials employed are accurately defined in the general formula. The alkyl radicals are for example lower aliphatic radicals such as ethyl and isopropyl radicals. The aryl radicals can for example be phenyl radicals and the aralkyl radicals can for example be benzyl radicals. Examples of suitable heterocyclic radicals include pyridine radicals. Acyl radicals include formyl and acetyl radicals.

The starting materials for the process according to the invention have not until now been known. However, they can be prepared in a simple manner by α-amino alkylation of isonitriles and carboxylic acids, using unsaturated amine or isonitrile components, by a known process known (see I. Ugi, Angewandte Chemie 74, page 9 et sec. (1962). This prior known process includes a number of variations. Thus, the reaction can for example be effected by combining a carboxylic acid, a ketone, an unsaturated amine and an isonitrile in molecular proportions in a solvent such as methanol and by allowing the mixture to stand at room temperature. The corresponding N-alkenyl carboxylic acid amide then crystallises out, usually immediately, from the solution. By suitable choice of the reaction components it is possible for the starting materials according to the invention to be prepared in simple manner by the method indicated. The following examples also include two examples for the production of the starting materials according to the invention, in which the reaction conditions are indicated. Although a total of four reaction components participate in the formation of the N-alkenyl carboxylic acid amides, the reaction proceeds in a very well-defined manner and under the simplest reaction conditions.

The following compounds can for example be prepared by the process of the invention: (1) Carboxylic acid amides: 5-methyl penicillanic acid amide, N-acetyl-n-butylamino-phenyl acetic acid amide, acetyl-valyl methionyl glycine, 1 - (N - formyl-benzylamino)-cyclohexane-1-carboxylic acid amide, phthalyl glycyl valyl glycine. (2) Carbonyl compounds: cyclohexanone, acetyl acetone, ethyl benzyl penaldate, aceto-acetic ester, (+)-formyl-camphor, cyclopentanone-2-carboxylic acid ethyl ester, dimedone-(+)-tetrahydro-oxo-dicyclopentadiene carboxylic acid ethyl ester. The corresponding starting materials can also be produced in accordance with the aforesaid equation from these end products.

The reaction according to the invention can also be carried out in the presence of solvents. Suitable solvents for this purpose include in general all inert solvents, but those which are at least partially miscible with water are preferred. These include mainly lower aliphatic alcohols such as methanol, isopropanol, isobutanol, glycol and ethers, such as dioxane, tetrahydrofuran and acetone. However, water can also be used as diluent.

The splitting of the N-alkenyl carboxylic acid amides is effected by water which adds on to the two molecular fragments. The reaction can be carried out exclusively in the presence of water, but splitting is facilitated by acids. Inorganic acids, such as hydrochloric acid, sulphuric acid and phosphoric acid, and organic acids such as formic acid, acetic acid, trifluoroacetic acid, citric acid and oxalic acid may be used.

The reaction according to the invention is carried out at temperatures between −20 and +150° C., advantageously between 20 and 100° C.

In order to split the N-alkenyl carboxylic acid amides, 1–2 mols of water are used per mol of this compound. One mol is necessary in every case, but it is also possible to use an excess, which is unlimited, since the excess water acts as diluent. Catalytic quantities to molecular excesses of acid may be used, based on the carboxylic acid amides to be split. The quantities are between 0.01 and 100 mols. When working with acid, this is preferably used in the form of solutions which are 0.001 to 10-times normal, advantageously 0.1 to 1-normal. The concentration of the acids is based on all the diluents which are present.

For carrying out the reaction according to the invention, the water and if desired the acid are added to the N-alkenyl carboxylic acid amide, which is preferably dissolved in a diluent. The mixture is kept for some time at a suitable temperature and the end product is then isolated. Working up is effected by the usual methods, the end product frequently crystallizing out immediately from the reaction solution. If this is not the case, water is added, neutralisation effected if necessary and the organic phase is extracted by shaking.

The process according to the invention has a number of advantages. It starts from starting materials which are now readily obtainable it uses known and simple auxiliary materials and is carried out under gentle reaction conditions. The yields and also the uniformity of the end products are very good and no secondary reactions occur. It is particularly important that the optical activity of starting substances is maintained in the splitting operation.

The compounds obtained according to the process of the invention constitute valuable intermediate products for the synthesis of insecticides and in particular of peptides and penicillin derivatives.

EXAMPLE 1

1.50 g. of 1-(N-formyl benzylamino)-cyclohexane-1-carboxylic acid-N'-cyclohexenyl-(1')-amide are dissolved in 20 cc. of methanol/tetrahydrofuran (ratio by weight 1:1). The mixture is heated to 20° C. and 0.5 concentrated hydrochloric acid is added. After half an hour, solid sodium bicarbonate is added in excess to neutralize the acid and the mixture which forms is stirred for about 5 minutes, and then filtered. The filtrate is concentrated and the organic solvents distilled off. The residue is dissolved in chloroform, the solution is washed with water, benzene is then added and concentration is carried out until crystallisation commences. 1.07 g. of 1-(N-formyl benzylamino)-cyclohexane-1-carboxylic acid amide (=93% of the theoretical melting point: 157–159° C.) are obtained. The splitting proceeds in accordance with the following reaction scheme:

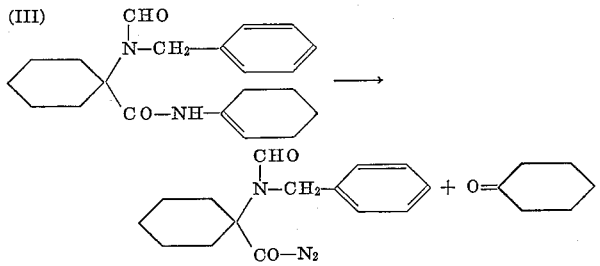

*Production of the starting material*

1 mol of formic acid, 1 mol of cyclohexanone, 1 mol of benzylamine and 1 mol of cyclohexane isocyanide are dissolved in methanol so that to form a solution which is as concentrated as possible. The reaction mixture is kept for some hours at 20° C., the reaction product slowly crystallising out. It is then filtered off with suction from the methanol and dried and can be used in this form directly for the reaction according to the invention.

EXAMPLE 2

A solution of 5.3 g. of crude phthalyl-glycyl-N-(1-carbethoxy-2-propenyl) valyl glycine tert. butylester in 20 cc. of methanol is acidified with concentrated hydrochloric acid to a pH of 1.0 and boiled for a short time. The phthalyl glycyl valyl glycine formed by splitting off of ethyl aceto-acetate and tertiary butyl chloride is precipitated as a crystalline deposit.

The yield is 1.99 g. (=55% of the theoretical). Melting point 276–279° C. The splitting takes place in accordance with the following reaction scheme:

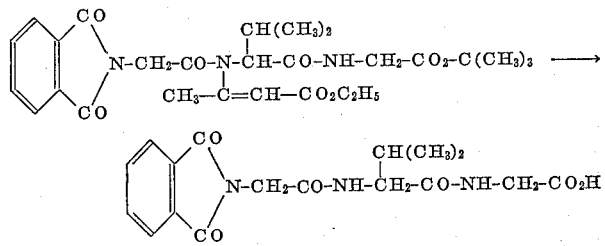

It is to be noted in this specific case that tertiary butyl chloride is split off from the ester group of the molecule. This splitting off has nothing to do with the actual reaction according to the invention.

The phthalyl glycyl valyl glycine used as starting material is prepared by a process which is already known, that is by reacting equimolar quantities of phthalyl glycine, β-amino crotonic acid ethyl ester, isobutyl aldehyde and isocyanacetic acid tert. butylester in methanol in a concentrated solution this mixture being kept for some time at temperatures between 10 and 25° C. The end product precipitates in crystalline form and is isolated by filtering with suction.

EXAMPLE 3

It shows the preparing of a peptide-derivative according to the following reaction scheme:

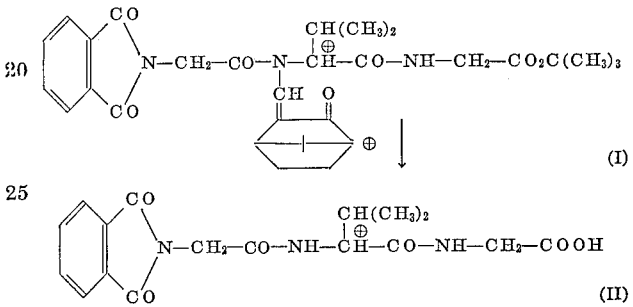

The phthalyl glycyl valyl glycine (I) used as starting material is prepared by treating equimolecular quantities of phthalyl glycine, (+)-amino methylene-camphor, isobutylaldehyde and isocyan-acetic acid tert. butylester in methanol at a temperature of between +10° C. and 25° C. The end product precipitates in crystalline form and is isolated by filtering with suction.

A solution of 8.0 g. of the phthalyl-glycyl-N-(1-methylene-camphoryl) valyl glycine tert. butylester in 20 ccm. of ethylacohol and 3 ccm. of concentrated hydrochloric acid is boiled for 15 minutes. After cooling the peptide-derivative (II) crystallizes. Yield: 2.4 g. Melting point: 273°–276° C.

What is claimed is:
1. 1-(N-formyl benzylamino)-cyclohexane-1-carboxylic acid amide having the formula

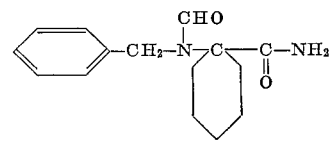

2. Phthalyl-glycyl-valyl-glycine having the formula

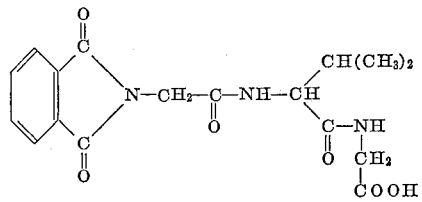

3. A carboxylic acid amide of the formula

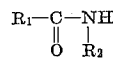

wherein $R_1$ stands for a member selected from the group consisting of 1-(N-formyl-benzylamino)-cyclohexyl and N-methylene-phthalimide and $R_2$ stands for

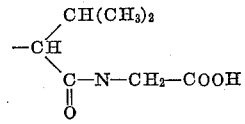

(References on following page)

References Cited by the Examiner

UNITED STATES PATENTS

| | | | |
|---|---|---|---|
| 1,954,433 | 4/1934 | Thomas et al. | 260—561 |
| 2,060,154 | 11/1936 | Whitmore et al. | 260—561 |
| 2,652,403 | 9/1953 | Buc | 260—326 |
| 2,653,155 | 4/1951 | Kittleson | 260—326 |
| 3,068,284 | 12/1962 | Brandstron et al. | 260—557 |
| 3,079,433 | 2/1963 | Speziale | 260—557 |

OTHER REFERENCES

Chem. Abstracts, vol. 51, p. 8680g, 1957.

LEWIS GOTTS, *Primary Examiner.*

EGON E. BERG, MARY U. O'BRIEN, PERRY A. STITH, *Assistant Examiners.*